Patented Oct. 31, 1933

1,933,158

UNITED STATES PATENT OFFICE 1,933,158

PROCESS FOR PRODUCING A CEREAL PRODUCT IN A NEW FORM

Ralph M. Bohn, Evanston, and Carl S. Miner, Glencoe, Ill., assignors to The Quaker Oats Company, Chicago, Ill.

No Drawing. Application August 6, 1930
Serial No. 473,511

6 Claims. (Cl. 99—10)

The present invention relates to a process of producing a cereal product in a new form, as well as a new cereal food product, suitable for human consumption and readily prepared by the mere admixture of hot water or hot milk whereby a fully cooked palatable and nutritious food product is produced. It has special reference to a precooked cereal and by this term, or its equivalent, we refer to a cereal product in which the starch has been so modified that no additional cooking is necessary to produce a hot cooked cereal food of satisfactory digestibility and edibility, i. e., the food may be prepared for consumption by the mere addition of hot water, hot milk or the like.

One of the objects of the invention is to produce a food product thoroughly precooked and substantially instantaneously convertible into a hot cooked cereal by the mere addition of hot water or milk.

Another object of the invention is to treat cereals or cereal products by an improvement in known methods of puffing in the presence of a predetermined percentage of moisture in which process the cereal is cooked under pressure and afterwards quickly discharged into an area of normal atmospheric pressure whereby the extraneous moisture will flash into steam thereby effecting the puffing of the cereal, following which, the resultant puffed product is milled to produce a precooked cereal product which is mixed with hot water or hot milk to produce a hot cooked cereal. It is understood that the term "milling" includes such operations as rolling, flaking, or other mechanical methods of modifying the form or size of the puffed or enlarged particles.

As heretofore manufactured for human consumption, cereal products have been prepared in two forms:

(1) An uncooked form which is to be cooked usually at or near boiling temperatures with sufficient water to form a thick gelatinous mass (examples of this type are rolled oats, corn-meal, farina, cracked wheat, etc.); and (2) A ready prepared form, i. e., ready to eat without further cooking, usually by adding cream and sugar or mixing with fruit (examples of the ready prepared type are corn flakes, rice flakes, puffed rice, puffed wheat, etc.).

The cereals which require cooking are practically always served hot, whereas the ready prepared type are, as a rule, served cold.

The preparation of cooked cereals, such as rolled oats, requires a certain minimum amount of labor and time. For this reason it is not customary to prepare individual portions of cooked cereal in restaurants and other public eating places so that each patron may have a freshly prepared portion, but rather a large quantity is cooked up at the beginning of the period during which the meal is served. Cooked cereals of this type lose their tastiness and desirable eating characteristics upon standing even under the best conditions for any considerable period of time, i. e., longer than thirty minutes or, at most, an hour. Moreover, any cereal which is not consumed during the meal for which it is prepared must usually be thrown away.

In household use, similar objections exist. The trouble and time required to prepare a cooked cereal preclude its use by one member of the family who may prefer a different cereal than the other members, or who may prefer a cooked cereal while the others do not eat cereal at all.

From the discussion just presented, it is obvious that a cereal which has characteristics somewhat similar to the present cooked cereals but which could be prepared instantly and economically in any quantity would have important advantages over any cereal known at present.

This invention relates to the manufacture of a cereal from any of the well known cereal grains, as well as to the method of preparation of said cereal in a new and novel manner to produce a hot cereal ready for consumption. Specifically it pertains to the manufacture of a cereal which is completely cooked and which merely requires thorough mixing with hot water to obtain a digestible and palatable product ready for consumption. The preparation or cooking of a cereal grain to improve its digestibility and palatability, i. e., to change it to a form ready for consumption, is chiefly a matter of subjecting the cereal to the influence of sufficient heat and moisture to modify the starch and make it readily digestible and palatable. Heretofore with the cooked cereals, i. e., of the rolled oats type, the cooking of the cereal has always been performed, either partially or completely, in the kitchen by the housewife or chef. With the cereals of our invention, sufficient "cooking", or treatment to make the product edible and readily digestible, is performed by the manufacturer of the cereal. The only step performed by the consumer is the addition of hot water or hot milk or the like to get the already cooked cereal in a form suitable for consumption.

In the preparation of our new cereal products, at least three major operations are performed. These are (1) cooking of the cereal by puffing either the entire berry or a portion of the berry from which more or less of the bran or germ or both have been removed. In this operation the starch is modified and made digestible and the physical structure of the grain or grain particle is profoundly altered. (2) Milling the cereal so that it more readily absorbs the hot water or hot milk or the like added in the final step. Grinding or flaking is usually necessary to make all parts of the cereal instantly accessible to the hot water. Some portion of the milling should take place subsequent to the puffing. (3) Addition of hot water or hot milk or the like to the cereal prepared in operations (1) and (2), accompanied by sufficient stirring and mixing to give a homogeneous mixture.

We shall now describe in detail the preferred methods of preparation of our new cereal from several of the cereal grains. The initial treatment of the cereal varies with the particular cereal used, as well as with the amount of bran or germ which has been removed from it. We have found that a desirable method of cooking the cereal is an improvement of the method heretofore used for puffing wheat and rice. When the cereal is one from which the bran or germ has not been removed and which consequently tends to burn very readily, the preferred method of puffing is as follows:

The cereal is hermetically sealed in a pressure cylinder which is provided with means for rotating the same slowly in a hot oven. One end of the cylinder is provided with a door or lid which may be opened to release the pressure within the cylinder instantaneously if desired. This is essentially the apparatus used at present for producing puffed rice and puffed wheat. Means are also provided for withdrawing the air or other gas from the cylinder at any time and also for introducing air or other gas under pressure. After the cylinder is loaded to about half its capacity with the cereal, the air is almost completely removed from the cylinder as rapidly as possible by means of a vacuum pump. The exhausted cylinder is then charged with a gas inert with respect to the cereal, such as nitrogen or carbon dioxide, to a super-atmospheric pressure. We have found that satisfactory results can be obtained with pressures ranging from 10 lbs. to 50 lbs. per square inch, although the lower pressures (10–20 lbs.) are preferable. The cylinder is rotated while being heated until the pressure within the cylinder has substantially increased, whereupon the door on the cylinder is opened and the pressure thereby instantaneously released. The final pressure obtained just before the release should be high enough to cause the grains or grain particles to "puff" slightly on their discharge from the cylinder, preferably to not more than about three times their size before puffing. This pressure may be, for example, between 100 and 200 lbs., depending on the cereal used, the initial gas pressure, the rate of heating of the cylinder, the water content of the cereal, and the degree of puffing desired. The cereal before puffing may be treated with water to increase the moisture content in a manner similar to that used in tempering wheat for flour milling, if desired. Whether such tempering treatment is necessary or desirable depends on the original moisture content of the cereal. If it is desired to add salt or flavor to the cereal, the proper amount of salt or flavor may be dissolved in the water used for tempering. When cereals substantially free from bran or germ, such as milled rice or degerminated corn grits, are puffed, the exhaustion of the air from the cylinder and the use of inert gas therein may not be necessary to prevent burning but even then may be desirable. The initial pressure may, if desired, in the latter case, be obtained with compressed air, the remainder of the puffing operation being the same. The methods of puffing heretofore used commercially may be utilized for the production of a new cereal but such methods must be modified in accordance with our invention so as to puff only to one and one-half to three times the size of the raw grain particle, instead of six or ten times the original size, as is done in the prior art methods.

During the puffing operation, the starch granules are cooked by the influence of the heat and moisture and then swelled when the pressure in the cylinder is subsequently released instantaneously and the grains puffed to an increased size. In this condition the cereal is easily and quickly digestible and properly may be termed precooked. In addition, the swelling which occurs during puffing helps make the starch and other parts of the berry readily accessible to the hot water which is added in the last operation. We shall now describe preferred methods for treating the various cereals to obtain our new precooked products.

1. Wheat (a) *Whole wheat.*—The wheat is tempered with water until the moisture content is between 15% and 30%, depending on the variety of wheat. It is puffed as follows: The wheat of 15% to 30% moisture content is placed in the cylinder. The air is exhausted by means of a vacuum pump and nitrogen gas is introduced to a pressure of 10 lbs. The cylinder is rotated while being heated until a pressure of 120 lbs. is obtained, preferably in eight to nine minutes, and the pressure substantially instantaneously reduced to atmospheric. An alternative puffing method: The wheat of 15% to 30% moisture content is placed in the cylinder which is rotated while heating until a pressure of 40 lbs. is attained in four to five minutes. This pressure is blown off through a valve and steam is introduced to a pressure of about 130 lbs. and held there for a half minute when the pressure is instantaneously reduced to atmospheric.

The resulting slightly puffed berries are coarsely ground. One cup of the ground cereal is mixed with approximately one and one-half cups of water at or near the boiling point, adding salt to taste. After a few seconds of stirring to get a uniform mixture, it is ready to eat, usually with cream and sugar as in the case of ordinary hot cereals. The hot cereal prepared from our new product as just described shows some important physical advantages over hot cereals made from wheat as prepared at present in that there is little or no sliminess. Alternatively, the slightly puffed wheat may be flaked instead of ground and the flakes mixed with hot water as described to form the ready-to-eat hot cereal.

(b) *Wheat of low bran content.*—When wheat is pearled, more or less of the bran and germ are removed, depending on the degree of pearling. It is not possible to remove all of the bran because of the crease in the wheat berry. The partially de-branned wheat is treated substantially the same as is described above for whole wheat. The resulting cereal is of milder flavor, as would be expected, and is extremely palatable.

(c) Another means for producing a wheat cereal of low bran content is available. If wheat (entire) is puffed slightly by the method described in (a) above and then given a milling treatment similar to that used in flour milling, portions of the wheat may be obtained which have a high bran content and other portions of low bran content. With proper milling procedure, products which make excellent hot cereals when mixed with hot water are obtained.

(d) To produce a precooked cereal of the farina (practically bran-free) type, a coarse semolina (large flour middlings) is used. This is puffed as follows: middlings of 15% to 20% moisture content are introduced into the cylinder. Gas under pressure, such as air or nitrogen, is introduced until a pressure of 15 lbs. is attained. The cylinder is rotated with heat until the pressure has risen to 110° in six to seven minutes when the pressure is instantaneously reduced to atmospheric. The puffed particles are then flaked. When these flakes are mixed with hot water a ready-to-eat hot cereal closely resembling farina cooked in the usual manner, i. e., boiling for 30 minutes to one hour, is obtained.

2. Oats

Oat groats are preferably tempered with 20% of water and lightly puffed as follows: The oat groats of 15% to 30% moisture content are loaded into the cylinder. The air is evacuated and nitrogen introduced to a pressure of 10 lbs. The cylinder is rotated with heat until a pressure of 160 lbs. is attained in six to seven minutes when the pressure is instantaneously reduced to atmospheric. An alternative puffing method: the loaded cylinder is rotated until a pressure of 40 lbs. is obtained. The pressure is reduced through a valve to atmospheric and steam is introduced to a pressure of 140 lbs. which is maintained for 30 seconds. The pressure is then suddenly reduced to atmospheric. The puffed groats may be either coarsely ground or flaked. The flaked or ground oats are mixed with hot water (and salt if desired) to give a cereal porridge ready for immediate consumption.

3. Barley

Pearled barley is tempered and lightly puffed as follows: The barley of 15% to 25% moisture content is loaded into the cylinder. Nitrogen gas is introduced into the cylinder until the pressure rises to 10 lbs. The cylinder is rotated with heat until a pressure of 110 lbs. is attained, when the pressure is instantaneously reduced to atmospheric. The puffed product is ground or flaked and mixed with hot water (and salt if desired) to produce a hot cooked cereal.

4. Rice (a) *Whole rice.* (*Natural brown*).—Natural brown rice is handled exactly like whole wheat or oat groats. It is tempered, lightly puffed, and the puffed product milled. The addition of hot water (and salt if desired) to the ground or flaked products gives a hot cooked cereal.

(b) *Milled rice.* (*White*).—Milled rice is tempered and lightly puffed as follows: The moisture content of the rice is raised to 15% to 20% by exposure to humid air. A suitable amount, say, half the capacity of the cylinder, is placed in the cylinder, which is sealed tightly. Compressed air is introduced until a pressure of 10 lbs. is obtained. The cylinder is rotated and heated so that the pressure rises to 120 lbs. in seven to eight minutes, when the pressure is instantaneously reduced to atmospheric. The lightly puffed rice may be ground or flaked. The ground or flaked product is mixed with hot water (and salt if desired) to form a hot cooked cereal.

5. Yellow corn

Corn is best handled to produce our new cereal if it has received a preliminary milling treatment, although the whole grain may be used. We have found that the product known to the trade as coarse corn grits, containing little or no bran or germ, can be tempered and lightly puffed as follows: The corn grits of 15% to 25% moisture content are introduced into the cylinder and the pressure in the cylinder raised to 10 to 15 lbs. with compressed air or nitrogen. The cylinder is rotated with heat until the pressure has risen to 110 lbs. in six to eight minutes, when the pressure is instantaneously released. The puffed product is then milled and mixed with hot water (and salt if desired) to form a corn-meal mush that is very satisfactory as such or for the preparation of fried mush.

6. White corn

White corn grits, substantially free from bran and germ, are tempered and lightly puffed in a manner similar to that for yellow corn grits. If the puffed product is coarsely ground and mixed with hot water (and salt if desired), a corn-meal mush is obtained. If, however, the puffed grits are tempered with sufficient water to prevent shattering, and flaked, a new type of food product is obtained. For making this product the preferred procedure is as follows: the preferred moisture content is 14% to 20%. The coarse corn grits, or pearl hominy, are introduced into the cylinder followed by compressed air or nitrogen to raise the pressure to 10 lbs. The cylinder is rotated with heat until the pressure has risen to 110 lbs., preferably in seven to nine minutes. The pressure is suddenly released. The puffed product is flaked quickly to prevent undue loss of moisture before flaking. The flakes are mixed with a minimum of hot water. In this case a loose, non-coherent mass of swelled flakes, of good flavor and general palatability is produced. This ready-to-eat product is an excellent substitute for potatoes, macaroni, rice, hominy grits and foods of like character. It is excellent when eaten with melted butter, gravy, cheese and in similar type dishes.

The essential features of the present invention will thus be seen to consist of the puffing of a cereal to a much lesser degree than has heretofore been practiced in the art, said puffing causing thorough cooking of the starch of the cereal and being followed by milling and the addition of a hot aqueous liquid to the puffed milled product to obtain a ready-to-eat hot cereal.

In United States Patents Nos. 766,212 and 990,093, puffed products which may be mixed with water to form a gruel are mentioned. A careful examination of the products described in the above mentioned patents shows them to be essentially different from the products of our present invention. The specific differences between the products of the above mentioned patents and the products of our invention are as follows:

I. Size

The puffed products described in United States Patents Nos. 766,212 and 990,093 are described as "greatly enlarged" and "six to eight times" or "eight to ten times" the size of the original grain. The puffed products which are manufactured for use in our ready-to-eat hot cereals are puffed to a much lesser degree, i. e., to only one and one-half to three times the size of the original berries or particles. We have found that a larger expansion than one and one-half to three times the size of the original berries or particles produces cereals, when mixed with the hot water, which have the following unsatisfactory characteristics:

(a) *Pastiness*.—When the puffed, milled product is mixed with hot water, a pasty, structureless, very soft porridge is produced if the original berry (or milled berry particle) is puffed to much more than three times the original size.

(b) *Flavor*.—With cereals puffed to much more than three times the original size, the ready-to-eat hot cereal normally has a decidedly burnt flavor, the degree of burning increasing with increase in size of the puffed product.

II. Degree of rupture of the starch granules

In the puffed products made as described in United States Patents Nos. 766,212 and 990,093, the starch granules have been "obliterated substantially" and "disrupted substantially". With our slightly puffed products this is by no means the case. The starch granules in the products of our present invention are rather swollen and are not generally "disrupted" or shattered, as shown by microscopical examination.

III (a) *Unmilled puffed products*.—The puffed products made as described in United States Patents Nos. 766,212 and 990,093 produce a gruel when mixed with water (temperature not specified). This indicates a considerable degree of degradation of the starch. The unmilled puffed products made in accordance with our present invention do not produce a smooth gruel with water of any temperature, even at boiling temperatures.

(b) *Milled puffed products*.—The milled puffed products produced as described in United States Patents Nos. 766,212 and 990,093 form a gruel when mixed with water (temperature not specified), presumably more readily than when unmilled. The puffed products of our present invention herewith do not make a suitable ready-to-eat cereal, even when milled, when mixed with cold water (or milk), but require admixture with hot, preferably boiling, water (or milk) to produce a porridge of proper eating characteristics.

IV. Degree of rupture of the bran—degerminating

The puffed products described in United States Patents Nos. 766,612 and 990,093 are characterized by shattering of the bran and separation of the germ to the extent that both may be removed by blowing, sifting or other mechanical means. The puffed products of our present invention are puffed to such a slight degree that no shattering of the bran or separation of the germ occurs. Any bran or germ removal must be performed by entirely different means—usually by pearling or milling prior to puffing.

V. Water used in tempering

The puffed products described in United States Patents Nos. 766,612 and 990,093 are made by puffing "substantially air-dry" cereal grains. We have found that in our invention it is not only desirable but usually necessary to add more or less water to the air-dry cereals before puffing, in order to produce the desired products. The characteristics vary rather markedly, depending on the moisture content of the grain at the time of puffing. A low-moisture grain when puffed produces a more spongy, finely divided starch structure, whereas the starch in a high-moisture grain is gelatinized more but is tougher. The difference is extremely noticeable on coarse grinding of the puffed products. The low-moisture puffed cereal gives off much flour during coarse grinding, whereas the high-moisture puffed cereal grinds to thin flakes with little flour. It is assumed, of course, that the moisture content at the time of grinding is the same.

VI. Water-soluble material

The following table shows the water-soluble material (one hour shaking of the ground material with water, room temperature, filtration, drying of the filtrate, weighing) of various puffed cereals of different degrees of puffing.

| Cereal | Added water tempering | Comparative bulk | Total water soluble | Ratio compared to original cereal |
|---|---|---|---|---|
| Wheat (pearled) | Untreated | 1 | 5.80% | 1 |
| Wheat (pearled) | 20% H₂O | 2½* | 7.15 | 1.23* |
| Wheat (pearled) | 20% H₂O | 6½' | 19.30 | 3.33' |
| Barley | Untreated | 1 | 4.85% | 1 |
| Barley | 10% H₂O | 2½* | 7.85 | 1.62* |
| Barley | 10% H₂O | 6¾' | 32.70 | 6.74' |
| Oats | Untreated | 1 | 4.80% | 1 |
| Oats | 15% H₂O | 1¾* | 8.35 | 1.74* |
| Oats | 15% H₂O | 5½' | 22.60 | 4.71' |
| White corn | Untreated | 1 | 2.25% | 1 |
| White corn | 8% H₂O | 2⅜* | 3.20 | 1.42* |
| White corn | 8% H₂O | 5½ | 4.90 | 2.18 |
| White corn | 8% H₂O | 7' | 6.00 | 2.67' |

* Degree of puffing of cereals in accordance with our invention.
' Degree of puffing of cereals described in United States Patents Nos. 766,212 and 990,093.

A superficial inspection of the table shows such marked differences in water-soluble material between the puffed cereals of our present invention and the food products of the prior art patents that it is obvious that we are working with quite different puffed cereals than are described in the prior art patents.

In the specific illustrative examples herein described we have specified certain moisture contents for the cereals to be puffed. The optimum results, as far as the cooked cereals are concerned, are probably obtained when the moisture contents are midway between those specified. However, we have determined that if the moisture contents of the cereals are kept within the limits described, very palatable cooked cereals result. But if the moisture contents are below those specified, the cooked cereals are not satisfactory as cooked foods and they become progressively unsatisfactory as the moisture contents decrease below those specified. If the moisture contents are above those specified, the mechanical difficulties of puffing are very great in that the cereal particles tend to stick to each other and to the cooking or pressure cylinder during puffing.

It is to be understood that the puffed cereal that forms the subject matter of our invention contemplates that it is not puffed more than about three times the original size of the berry or cereal particle. In some instances the original cereal material may be puffed to about one and one-quarter to two times its original size. In other instances it may be puffed to about three and one-half times its original size. In all instances we have found that if the cereal material is puffed more than about four times its original size, the final hot cereal is too mushy and possesses a burnt taste which renders it unpalatable. The puffing increase to three times the original size is the limit to which the cereal can be puffed with the production of quick cooking cereals of the highest quality. As the size of the puffed cereal is increased above three times that of the original cereal particle, the hot quick cooking cereal becomes progressively poorer in quality, i. e., increasingly mushy, pasty, and burnt. When mention is made herein of increasing the size of the cereal by puffing to three times the original size, we do not mean that each individual cereal particle is precisely three times its original size but that the volume of the entire lot of the cereal puffed has been increased from for example, 1 cu. ft. to 3 cu. ft.

Obvious modifications of the processes hereinabove described are, of course, to be considered as within the scope of the invention for which we claim and desire to protect by Letters Patent as follows:

1. A precooked cereal food comprising a milled non-toasted cereal product that has been puffed, previously to milling, to not more than three times its original size and in which the starch granules are swollen without complete disruption.

2. A hot precooked cereal food comprising hot aqueous liquid absorbed in a non-toasted milled cereal product that has been puffed previously to milling to not more than three times its original size, the starch granules in said puffed product, prior to mixture with the hot aqueous liquid being swollen without complete disruption.

3. A precooked non-toasted milled cereal of satisfactory digestibility, palatability and edibility in which the starch, previously to milling, has been so modified that the size of the cereal is not in excess of three times its original size and that by adding a hot aqueous liquid thereto the same is immediately absorbed in said milled cereal and a hot cooked cereal food results.

4. The method of preparing a non-toasted cereal food which comprises subjecting moist cereal material to an elevated temperature and pressure, releasing said pressure substantially instantaneously thereby puffing said cereal material, the moisture content of the cereal material and the pressure and temperature being so controlled that the cereal is puffed to not more than three times its original volume, and then milling said cereal material.

5. The method of preparing a non-toasted cereal food which comprises subjecting cereal having a moisture content of not less than fifteen per cent to an elevated temperature and pressure, and releasing said pressure substantially instantaneously, thereby puffing said cereal without complete disruption of the starch granules to not more than three times its original volume, and then milling the individual cereal particles.

6. The method of preparing a hot non-toasted cooked cereal food of satisfactory digestibility and palatability which comprises subjecting cereal material having a moisture content of not less than fifteen per cent to an elevated temperature and pressure which are so controlled that on releasing said pressure substantially instantaneously the said cereal material will be puffed to not more than three times its original volume, thereby enlarging the starch granules without complete disruption, milling the cereal, and adding thereto a hot aqueous liquid which becomes absorbed in said cereal.

RALPH M. BOHN.
CARL S. MINER.